US011010759B1

(12) United States Patent
Maeng

(10) Patent No.: US 11,010,759 B1
(45) Date of Patent: May 18, 2021

(54) VENDOR SPECIFIC PAYMENT ACCOUNT IDENTIFIER

(71) Applicant: Wells Fargo Bank, N.A., San Francisco, CA (US)

(72) Inventor: Joon Maeng, Newcastle, WA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 126 days.

(21) Appl. No.: 16/128,070

(22) Filed: Sep. 11, 2018

Related U.S. Application Data

(60) Provisional application No. 62/557,426, filed on Sep. 12, 2017.

(51) Int. Cl.
*G06Q 20/38* (2012.01)
*G06Q 20/40* (2012.01)
*G06Q 20/36* (2012.01)
*G06Q 20/06* (2012.01)

(52) U.S. Cl.
CPC ....... *G06Q 20/385* (2013.01); *G06Q 20/0658* (2013.01); *G06Q 20/363* (2013.01); *G06Q 20/3678* (2013.01); *G06Q 20/4016* (2013.01)

(58) Field of Classification Search
None
See application file for complete search history.

(56) References Cited

U.S. PATENT DOCUMENTS 6,327,578 B1 * 12/2001 Linehan ................. G06Q 20/02
705/65
8,565,723 B2 10/2013 Cox
10,387,874 B1 * 8/2019 Birand ................. G06Q 20/385
2008/0243702 A1 * 10/2008 Hart ................... G06Q 20/3672
705/66
2009/0216676 A1 * 8/2009 Mathur ................ G06Q 20/322
705/44

(Continued)

FOREIGN PATENT DOCUMENTS

WO 2015195217 12/2015

OTHER PUBLICATIONS

Bidgoli, "The Internet Encyclopedia," John Wiley & Sons, pp. 526-533. (Year: 2004).*

(Continued)

*Primary Examiner* — Jacob C. Coppola
(74) *Attorney, Agent, or Firm* — Walter Haverfield LLP; James J. Pingor

(57) ABSTRACT

A system, computer-readable storage medium and method provide a secure transaction by receiving, from a mobile wallet a request to assign a vendor specific payment account identifier (VSPAI) to a payment account identifier (PAI) associated with a user of the mobile wallet. Identifying information is verified of: (i) an issuer of the PAI, (ii) a specific vendor; and (iii) the user of the mobile wallet. In response to verifying, a unique VSPAI is created that is associated with the PAI of the user and the specific vendor. Then, when a payment request is received including the unique VSPAI for a transaction with a particular vendor, the particular vendor is verified as the specific vendor associated with the unique VSPAI. In response to verifying that the particular vendor, payment of the transaction by the issuer using the PAI associated with the unique VSPAI is facilitated.

17 Claims, 9 Drawing Sheets

(56) References Cited

U.S. PATENT DOCUMENTS

| | | |
|---|---|---|
| 2012/0136796 A1* | 5/2012 | Hammad ............ G06Q 20/3674 |
| | | 705/67 |
| 2012/0158584 A1* | 6/2012 | Behren .................. G06Q 20/10 |
| | | 705/41 |
| 2013/0110658 A1 | 5/2013 | Lyman et al. |
| 2013/0124364 A1 | 5/2013 | Mittal |
| 2013/0144756 A1 | 6/2013 | Farrarons et al. |
| 2013/0282588 A1 | 10/2013 | Hruska |
| 2015/0032626 A1* | 1/2015 | Dill ........................ G06Q 20/40 |
| | | 705/44 |
| 2015/0127547 A1* | 5/2015 | Powell ................. G06Q 20/385 |
| | | 705/67 |
| 2015/0161603 A1 | 6/2015 | Fish |
| 2016/0180333 A1* | 6/2016 | Leyva ..................... G06F 21/41 |
| | | 705/41 |
| 2016/0335623 A1 | 11/2016 | Taveau et al. |
| 2017/0039568 A1* | 2/2017 | Tunnell .............. G06Q 20/4014 |
| 2017/0111345 A1* | 4/2017 | Heiman ................ H04L 63/083 |
| 2018/0330364 A1* | 11/2018 | Driscoll ............... G06Q 10/083 |

OTHER PUBLICATIONS

Apple, "Apple Pay JS: Use JavaScript to incorporate Apple Pay into your websites.", retrieved from: https://developer.apple.com/reference/applepayjs?changes=latest_beta.

* cited by examiner

VENDOR SPECIFIC PAYMENT ACCOUNT IDENTIFIER

CROSS-REFERENCE TO RELATED APPLICATIONS

This application claims the benefit of U.S. Provisional Patent Application Ser. No. 62/557,426 filed on Sep. 12, 2017 and entitled "VENDOR SPECIFIC PAYMENT ACCOUNT IDENTIFIER", the entirety of which is expressly incorporated herein by reference.

BACKGROUND

The present application relates to mobile wallets, and more particularly to protecting payment account identifiers associated with mobile wallets.

When people registered with web stores or service providers, they create user profile with one or more credit card numbers including user (account holder) name, address, and/or phone number. For instance, users store a credit card number to register with Uber (transportation company utilizing online network) services with their mobile devices such as smartphone or tablet computer. Uber service automatically processes the payment with the user's credit card. Users also store their credit card numbers at online stores such as Amazon to receive quick services without entering the card number again at each purchase. Hackers often steal a large number of payment information from web stores or service providers and use them for fraudulent transactions.

Third-party payers such as PAYPAL have arisen to be an intermediary so that the individual vendors do not have to directly handle payment account identifiers (PAIS). However, these third-party payers are themselves the target of malicious activities. Once criminals obtain sufficient information about an individual, the third-party payer can be used to transact for a wide variety of goods and services through numerous vendors. Significant financial damage can occur before such misuse is detected and stopped. Even if the user is made whole, the increased cost of doing business due to such theft increases the overall charges that must be levied by the third-party payer for this intermediary service.

There is a need to protect payment accounts stored in online stores and service providers from hackers and to prevent losses caused by hacked account information.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of techniques or systems for secure transactions are provided herein. Generally, the present innovation mitigates unauthorized access to a payment account identifier such as a credit card number by using a vender-specific payment account identifier (VSPAI).

In one or more embodiments, the present disclosure provides a method of providing a secure transaction. The method includes receiving, from a mobile wallet executed by a user device, a request to assign a VSPAI to a payment account identifier (PAI) associated with a user of the mobile wallet. The method includes verifying identifying information of: (i) an issuer of the PAI, (ii) a specific vendor; and (iii) the user of the mobile wallet that are intended to transact using the unique VSPAI. In response to verifying the identifying information, the method includes creating a unique VSPAI that is associated with the PAI of the user and the specific vendor. The method includes receiving, from the user device, a payment request including the unique VSPAI for a transaction with a particular vendor. The method includes verifying that the particular vendor is the specific vendor associated with the unique VSPAI. In response to verifying that the particular vendor, the method includes facilitating payment of the transaction by the issuer using the PAI associated with the unique VSPAI.

In one or more embodiments, the present disclosure provides a system including a communication component that receives, from a mobile wallet executed by a user device, a request to assign a VSPAI to a PAI associated with a user of the mobile wallet. A payment account component verifies identifying information of: (i) an issuer of the PAI, (ii) a specific vendor; and (iii) the user of the mobile wallet that are intended to transact using the unique VSPAI. A vendor-specific account component, in response to verifying the identifying information, creates a unique VSPAI that is associated with the PAI of the user and the specific vendor. The communication component, from the user device, receives a payment request including the unique VSPAI for a transaction with a particular vendor. The payment account component verifies that the particular vendor is the specific vendor associated with the unique VSPAI. The payment account component, in response to verifying that the particular vendor, facilitates payment of the transaction by the issuer using the PAI associated with the unique VSPAI.

In one or more embodiments, the present disclosure provides a computer-readable storage medium including computer-executable instructions. When executed via a processing unit on a computer performs acts, the instructions cause processing unit to perform the above-described method.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

FIG. 3 illustrates a timing diagram of a system for secure transactions, according to one or more embodiments;

DETAILED DESCRIPTION

Figure 1:
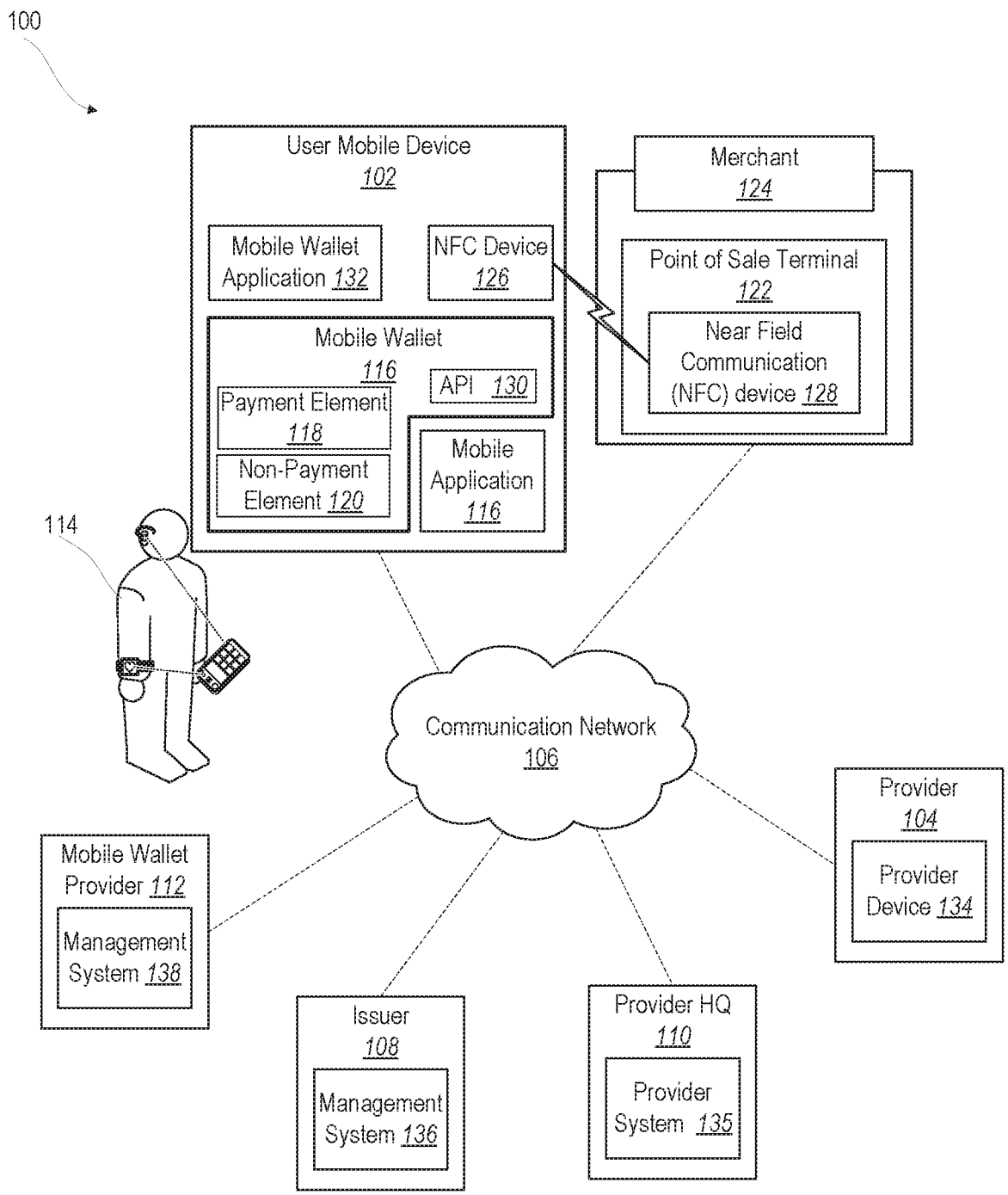
FIG. 1 illustrates a block diagram of a system for secure transactions, according to one or more embodiments.

A system, computer-readable storage medium and method provide a secure transaction by receiving, from a mobile wallet executed by a user device, a request to assign a vendor specific payment account identifier (VSPAI) to a payment account identifier (PAI) associated with a user of the mobile wallet. Identifying information is verified of: (i) an issuer of the PAI, (ii) a specific vendor; and (iii) the user of the mobile wallet that are intended to transact using the unique VSPAI. In response to verifying, a unique VSPAI is created that is associated with the PAI of the user and the specific vendor. Then, when a payment request is received including the unique VSPAI for a transaction with a particular vendor, the particular vendor is verified as the specific vendor associated with the unique VSPAI. In response to verifying that the particular vendor, payment of the transaction by the issuer using the PAI associated with the unique VSPAI is facilitated.

The present innovation discloses a system and method of producing and processing vendor specific payment account identifiers (VSPAIs). The VSPAI can be used as a secure way to effect payment for a goods or service without risking the malicious access to the associated actual payment account identifier (PAI). Third-parties that succeed in accessing VSPAI information held by a merchant, vendor, etc., will be unable to capitalize on the theft since usage of the VSPAI is constrained to a narrow category of purchases that are verified. Services that can be purchased include rental or common carrier services such as UBER, AIRBNB, etc. Goods that can be purchased include transaction facilitated through direct-to-consumer websites such as AMAZON and retail transactions performed at a physical store location such as TARGET. For instance, a buyer downloads a VSPAI-enabled mobile app for a smartphone. When the buyer registers with an associated vendor web site with the VSPAI-enabled mobile app, the VSPAI-enabled mobile app requests to get a VSPAI which can be used only at the associated vendor web site for a payment account in the mobile wallet via an application programming interface (API). The associated vendor web site keeps the VSPAI issued by the payment issuer in its web site with user profile information. The buyer may purchase a products at the associated vendor web via the smartphone or any computing device. The buyer uses the VSPAI stored in the mobile device to make payments. If the issuer positively identifies the vendor using VSPAI, the issuer may authorize the payment request. If the issuer cannot positively identifies vendor using VSPAI, the issuer may request the mobile wallet to verify the purchase and processes the payment authorization.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

In the present invention, a payment account identifier (PAI) is an identifier such as number that can be used for payment at online store or brick-and-mortar store to purchase products or services. A PAI can be a payment card number, or simply a card number, which is the card identifier found on payment credit/debit cards such as Visa, MasterCard, and American Express, a checking/savings account number at a bank, a gift card number issued by a vendor, or other number associate with payment which can be used to make payments. Online users may register with online stores or service providers and store one or more PAIS to make payments easily without entering it at each transaction.

FIG. 1 illustrates an exemplary environment 100 according to aspects of the present innovation. The environment 100 includes an electronic user mobile device 102, a provider 104, a communication network 106, an issuer 108, a provider headquarters (HQ) 110, and a mobile wallet provider 112. In one or more embodiments, the user device 102 can be portable, vehicle-mounted, or fixed in specific location.

A user 114 of user mobile device 102, such as smartphone or tablet computer, uses a mobile wallet 116 to make payments. A mobile wallet 116, also referred to as digital or electronic wallet, is an application program in a computing device, typically in mobile devices such as smartphone and tablet computer. Mobile wallet 116 allows an individual to make electronic commerce transactions, which may include purchasing items and making payments. Generally-known mobile wallet 116 include WELLS FARGO WALLET, APPLE PAY, GOOGLE WALLET, PAYPAL, SAMSUNG PAY, and STARBUCKS APP. The mobile wallet 116 comprises one or more of payment elements 118 and non-payment elements 120. As a non-inclusive list, exemplary payment elements can include but are not limited to credit card, debit card, and bank account. As a non-inclusive list, exemplary non-payment elements can include but are not limited to passport, driver's license, insurance card, employee card, student ID, and member card. The user 114 may select a payment element 118 in the mobile wallet 116. The user 114 taps the mobile device 102 with a point of sale terminal 122 at a merchant 124 to make a payment over respective near field communication (NFC) devices 126, 128.

The mobile wallet 116 includes an application program interface (API) 130 which provides mobile applications 132 in the mobile device 102 to interface with the API 130. For instance, a mobile application 132 may request a list of payment elements in the mobile wallet 116 via the API 130. A mobile wallet application 134 is an application program similar to the mobile wallet 116 which is provided by the provider 104 and used in providing services or selling products.

A provider 104 uses a provider device 134 to manage the service. The provider 104 provides the mobile application 114 to fulfill its services with the provider device 134. The provider device 134 interfaces with provider system 135 at the provider HQ 110. For instance, an Uber service provider (i.e., driver) uses its mobile device (e.g., smartphone with GPS) to interfaces with the system at Uber HQ. In some embodiment, the provider 104 may be a store and the provider HQ 110 may reside in the same premise with the provider 104 and the provider device 134 is an integral part of the provider system 135. For instance, a cosmetics department in a department store is a provider 104 and its POS device is a provider device 134 and the backend system is a provider system 135 in the department store is a provider HQ 110.

An issuer 108 is a financial institution such as bank and credit card company which issued one or more payment elements (e.g., credit card, debit card, checking account) to the mobile wallet 116. The issuer 108 may use an account management system 136 to issue payment elements to mobile wallet 116, manage account holders and process payment made by the mobile wallet 116 with the issu6ed account. For instance, mobile wallet 116 may install a payment account issued by the issuer 136 via the communication network 106 and get a new payment card via the communication network 106.

A mobile wallet provider 112 is the provider of mobile wallet 116 application to the user 102 and provide services with the management system 138. Exemplary mobile wallet providers are Apple for Apple Pay, Google for Google Wallet and Samsung for Samsung Pay and Wells Fargo for Wells Fargo Wallet. In some cases, the issuer 108 and the mobile wallet provider 112 are the same entity.

A communication network 106 is virtual representation of one or more communication media or method which provide communication between entities 102 104 108 110 112. The communication network 106 may comprise the Internet, mobile network, local area network, home network, personal area network (PAN), Wi-Fi, Bluetooth, or others.

Users 102 may use mobile wallet 116 or other computing device to register with a web site operated by the provider 104. The web site reside in the provider system 135 or is provided by a third party. Users 114 provide one or more PAI to use in payments and user profile and store them at the web site when they registers with the web site. To limit the damage caused by hackers stealing user account information at the web site, which is the provider 104, the present innovation uses a vendor-specific payment account identifier (VSPAI). A VSPAI is a payment account number which can be used at the specific vendor only. In other words, if a user submits a first vendor's VSPAI to purchase a product or service to a second vendor, the issuer 112 rejects the payment authorization.

Figure 2:
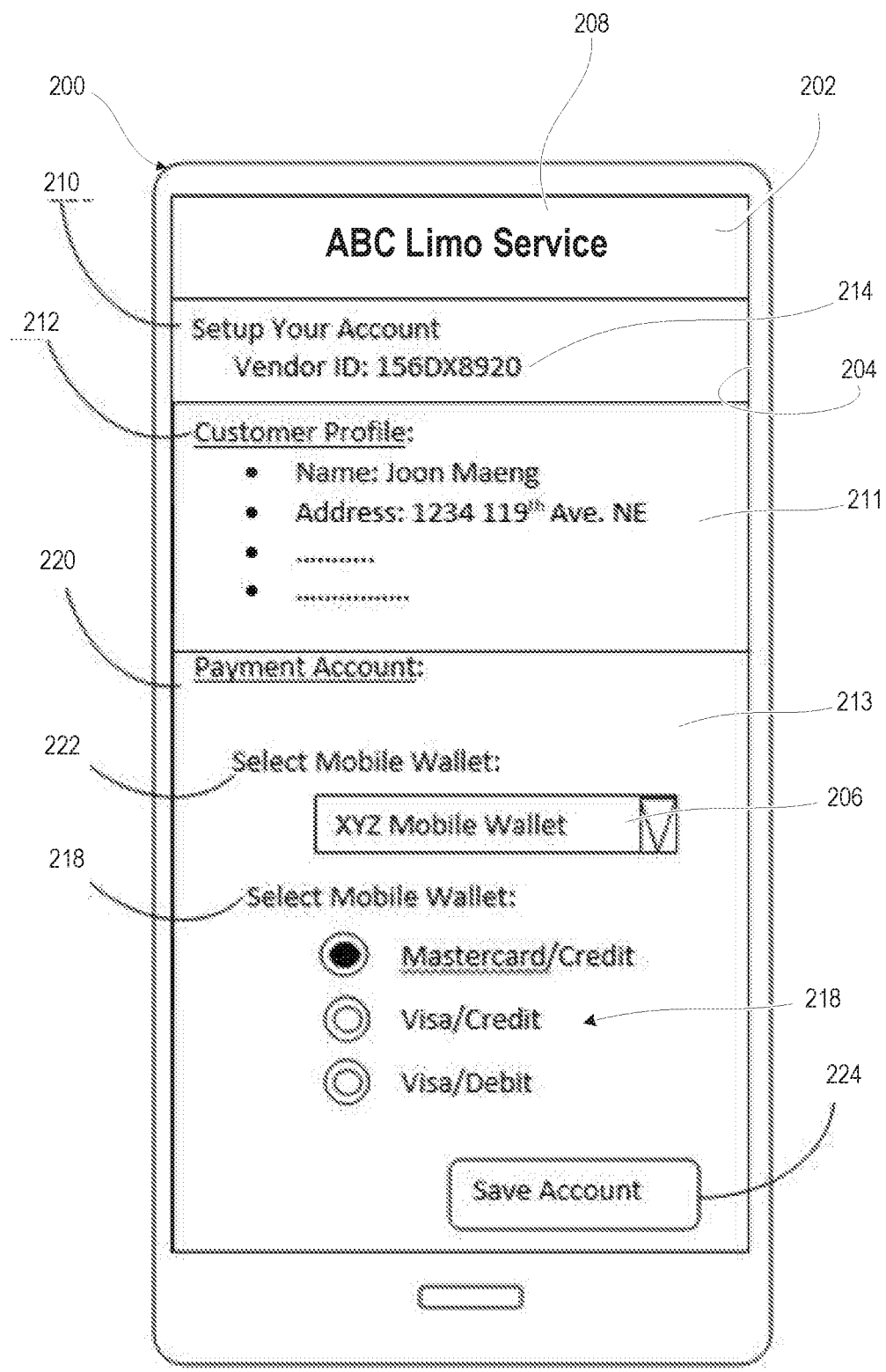
FIG. 2 illustrates a depiction of a user interface on a user device, according to one or more embodiments.

FIG. 2 illustrates a user device 200 having a user interface 202 presented on a display 204 that facilitates generating a VSPAI in a mobile wallet 206. A user may access a mobile application (app) 208 provided by ABC Limo Service. An account setup page 210 comprises a first window 211 to register customer profile 212 and a second window 213 to create a VSPAI. The account setup page 210 shows a unique vendor ID 214 for the issuer to identify the VSPAI. The vendor ID 214 may be a unique identifier produced by the issuer or it may be a unique ID issued by a government or industry.

The user may enter customer profile such as name, address, phone number, and so on in the customer profile first window 211. The ABC Limo Service mobile app 208 identifies one or more mobile wallets 206 and obtain one or more payment element names 218 in each mobile wallet 206 via an API published by mobile wallets 208 and present the payment element names 218 in the second window 213. In some mobile devices, there may be more than one mobile wallet app 208 that can be selected via a control affordance 222, such as XYZ mobile wallet 222. The ABC Limo Service mobile app 208 interfaces with the API (not shown) provided by the mobile app 208 and lists one or more of payment accounts (payment element names 218) in the XYZ mobile wallet 222 that support VSPAI-based transactions. For instance, the user select MasterCard to produce VSPAI for the specific vendor, ABC Limo Service. Note that some payment issuers may not support VSPAI; the mobile wallet provider can specify a list of payment element names 218 that support VSPAI only.

The action of touching the save account button 224 will request the issuer of the MasterCard/Credit in the XYZ mobile wallet 222 to issue a VSPAI. The ABC Limo Service can save the VSPAI along with the customer profile when the ABC Limo Service receives the VSPAI via the mobile app 208.

In one or more embodiments, a user may open the mobile wallet 206 with a personal identification number (PIN) and access a payment element name 218 such as MasterCard/Credit. The MasterCard/Credit may provide a feature to get VSPAI for a specified vendor. The user may enter vendor name with location or vendor ID 214 in the MasterCard/Credit and request a VSPAI for the specified vendor. The issuer produces a VSPAI, which is different from the primary account number of the card for the specified vendor, and sends the VSPAI to the mobile wallet 222. The user can use the VSPAI to register with a web site of a vendor along with user profile. The user may use the VSPAI to purchase products or services at the web site and the issuer verifies if the VSPAI submitted by the vendor matches with vendor ID. If the VSPAI and vendor ID do not march, the issuer may deny payment authorization. There can be other methods of getting a VSPAI for a specific vendor.

Figure 3:
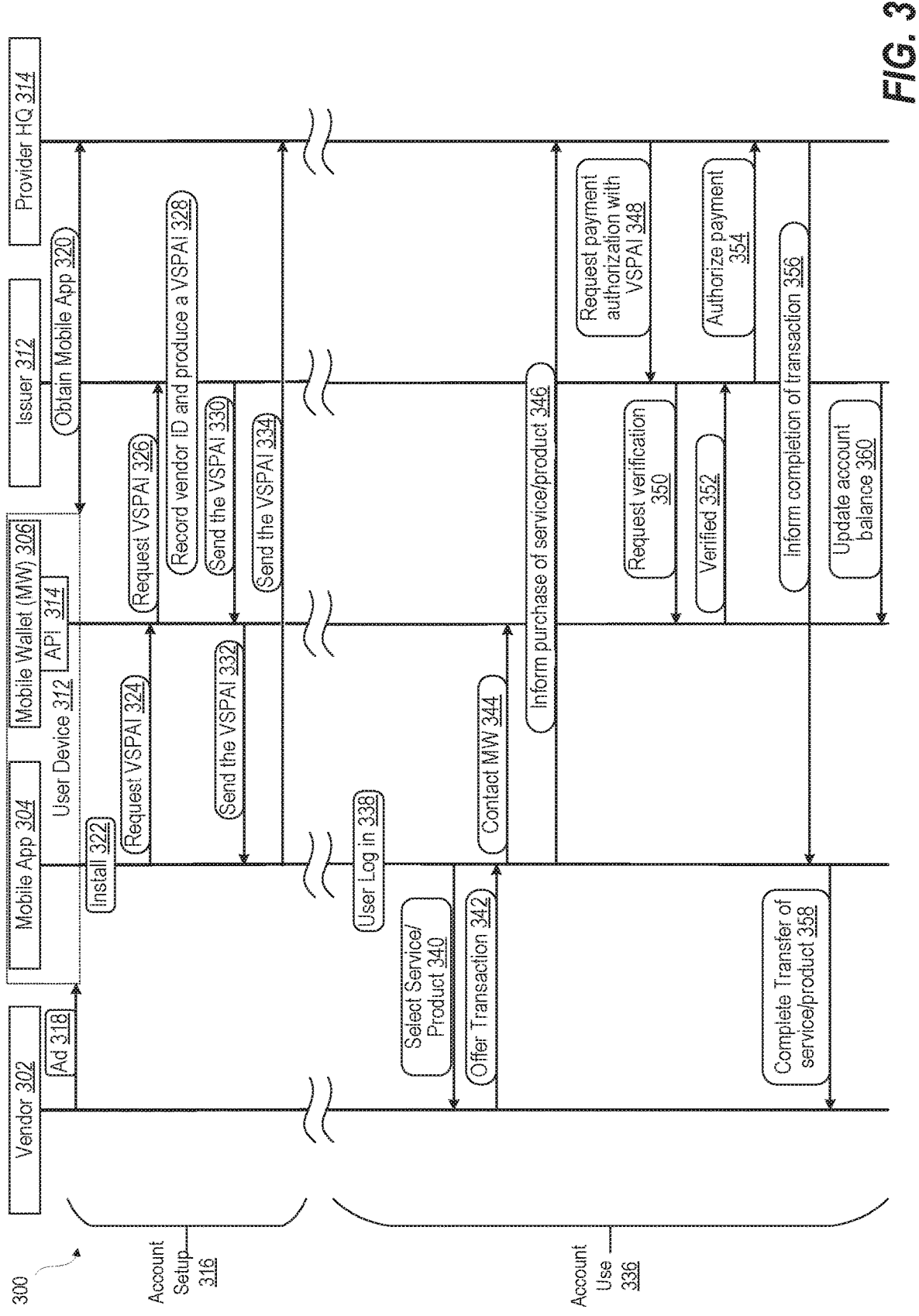
FIG. 3 illustrates a block diagram of a communication system for secure transactions, according to one or more embodiments.

FIG. 3 illustrates an exemplary method 300 of producing and processing VSPAI performed by a vendor 302, mobile application (app) 304, mobile wallet (MW) 306, issuer 308, and provider HQ 310. The user can use one or more user devices 312 that support the mobile app 304 and mobile wallet 306. The mobile wallet 306 provides an application programming interface (API) 314 that communicates with one or more mobile apps 304. In an initial account setup phase 316, the vendor 302 advertises their mobile app 302 (block 318). For example, the vendor 302 sends an email, snail mail, posts a sign at a physical retail location, has a link on their web site, etc. The user via the user device 312 obtains the mobile app 304 from the provider HQ 314 (block 320). For instance, UBER company is provider HQ 308 and mobile app 302 is the UBER app used by the user in his user device 312. The user device 312 installs the mobile app 304, including linking to the mobile wallet 306 via the API 314 (block 322).

The user via the user device 312 sets up an account with VSPAI in order to protect the user's credit card information. The mobile app 302 (e.g., ABC Limo Service) requests a VSPAI facilitated by the mobile wallet 306 when the user touches the save account button via the API 314 (block 324). The mobile wallet 306 requests a VSPAI to the issuer 312 in step (block 326). The issuer 312 records the vendor ID and produces a VSPAI, which is different from the user PAI (block 328). Issuer 312 sends the VSPAI to the mobile wallet 306 (block 330). The mobile wallet 306 sends the VSPAI to the mobile app 302 (block 332). The mobile app 304 sends the VSPAI to the mobile app provider HQ 314 (block 334). In other embodiment, the mobile wallet 302 may keep the VSPAI in the mobile app 302 and facilitate sending the VSPAI to the provider HQ 308.

In a subsequent account use phase 336, the user uses the VSPAI account. In block 338, when the user intends to use a service or buy a product, the user logs in the mobile app 302 to use the mobile app 302 (e.g., call Uber service). The mobile app 304 can be the conduit through which the service or product is selected or can otherwise receive identification of the intended subject of the transaction (block 340). For example, the user can select an item presented on a user interface, can scan indicia on a sample product or advertisement, can communicate with a kiosk or point-of-sale (POS) device, etc. The vendor 302 responds to the mobile app 304 to offer the selected service or product at a particular price (block 342). Mobile app 304 informs the mobile wallet 306 via the API 314 (block 344). The mobile app 302 informs the purchase of service or product to the provider HQ 308 before, during or after the service is provided as required (e.g., Uber service is complete) or when a purchase is processed (block 346). The provider HQ 308 requests a payment authorization to the issuer 312 with the VSPAI (block 348). The issuer 312 requests verification of the transaction from the mobile wallet 306 (block 350). The mobile wallet 306 confirms or verifies the service or produce purchase (block 352). The issuer 312 issues a payment authorization to the provider HQ 314 if the transaction is positively verified with the mobile wallet 306 (block 354). In other embodiments, the verification of the transaction with the mobile wallet 306 may be omitted as long as the VSPAI and the vendor using the VSPAI is positively identified.

The provider HQ 308 informs completion of transaction to the mobile wallet 306 (block 356). The vendor 302 receives confirmation that the transaction is complete from either the mobile app 304 or provider HQ 314 and completes the transfer of the product or performance of the service (block 358). The issuer 312 sends an update of balance to the mobile wallet 306 (block 360).

Figure 4:
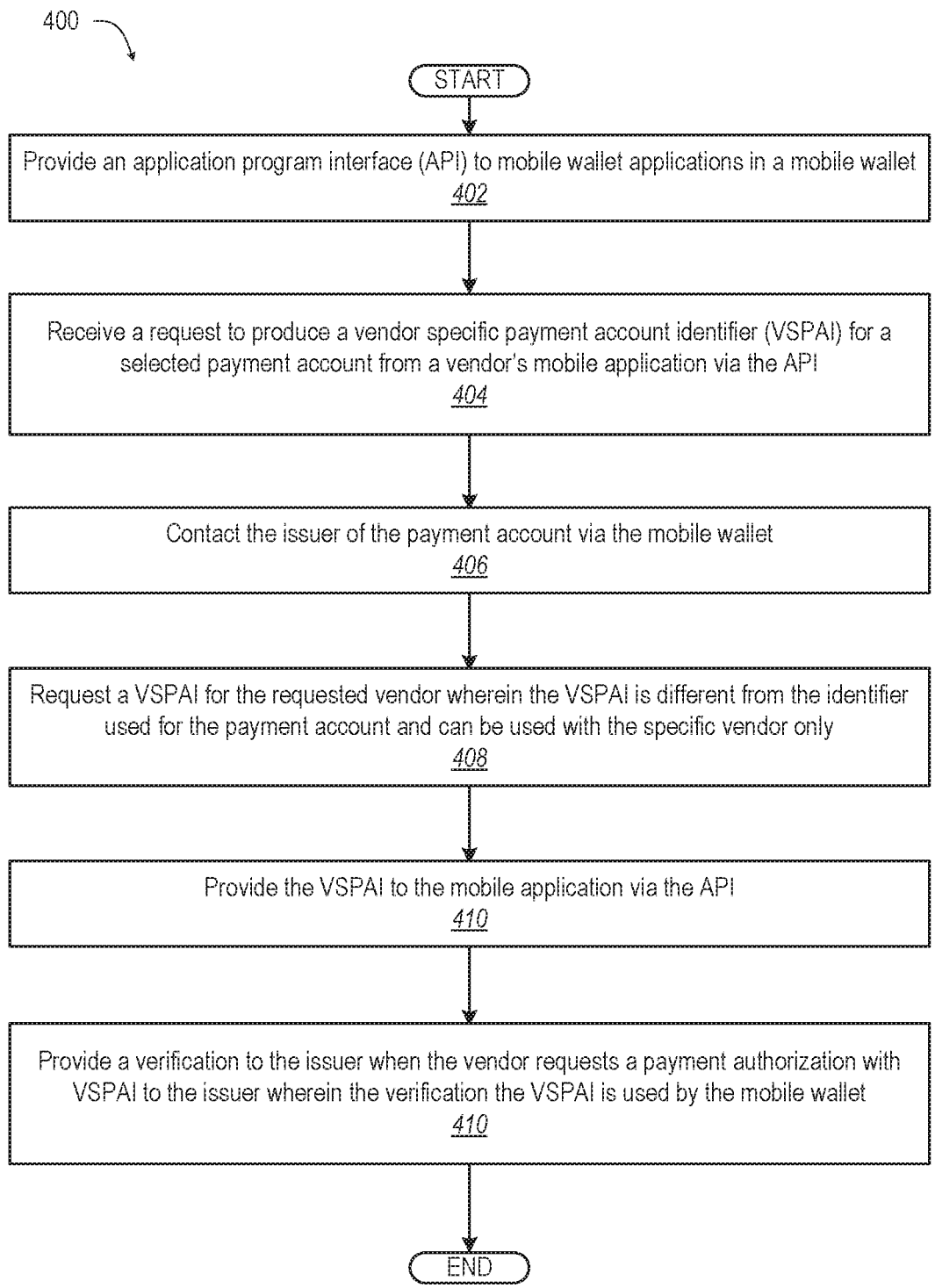
FIG. 4 illustrates a flow diagram of a method of secure transactions, according to one or more embodiments.

FIG. 4 illustrates a method 400 of providing secure transaction. In one or more embodiments, method 400 begins providing an application program interface (API) to mobile wallet applications in a mobile wallet (block 402). Method 400 includes receiving a request to produce a vendor specific payment account identifier (VSPAI) for a selected payment account from a vendor's mobile application via the API (block 404). Method 400 includes contacting the issuer of the payment account via the mobile wallet (block 406). Method 400 includes requesting a VSPAI for the requested vendor wherein the VSPAI is different from the identifier used for the payment account and can be used with the specific vendor only (block 408). Method 400 includes providing the VSPAI to the mobile application via the API (block 410). Method 400 includes providing a verification to the issuer when the vendor requests a payment authorization with VSPAI to the issuer wherein the verification the VSPAI is used by the mobile wallet (block 412). Then method 400 ends.

Figure 5:
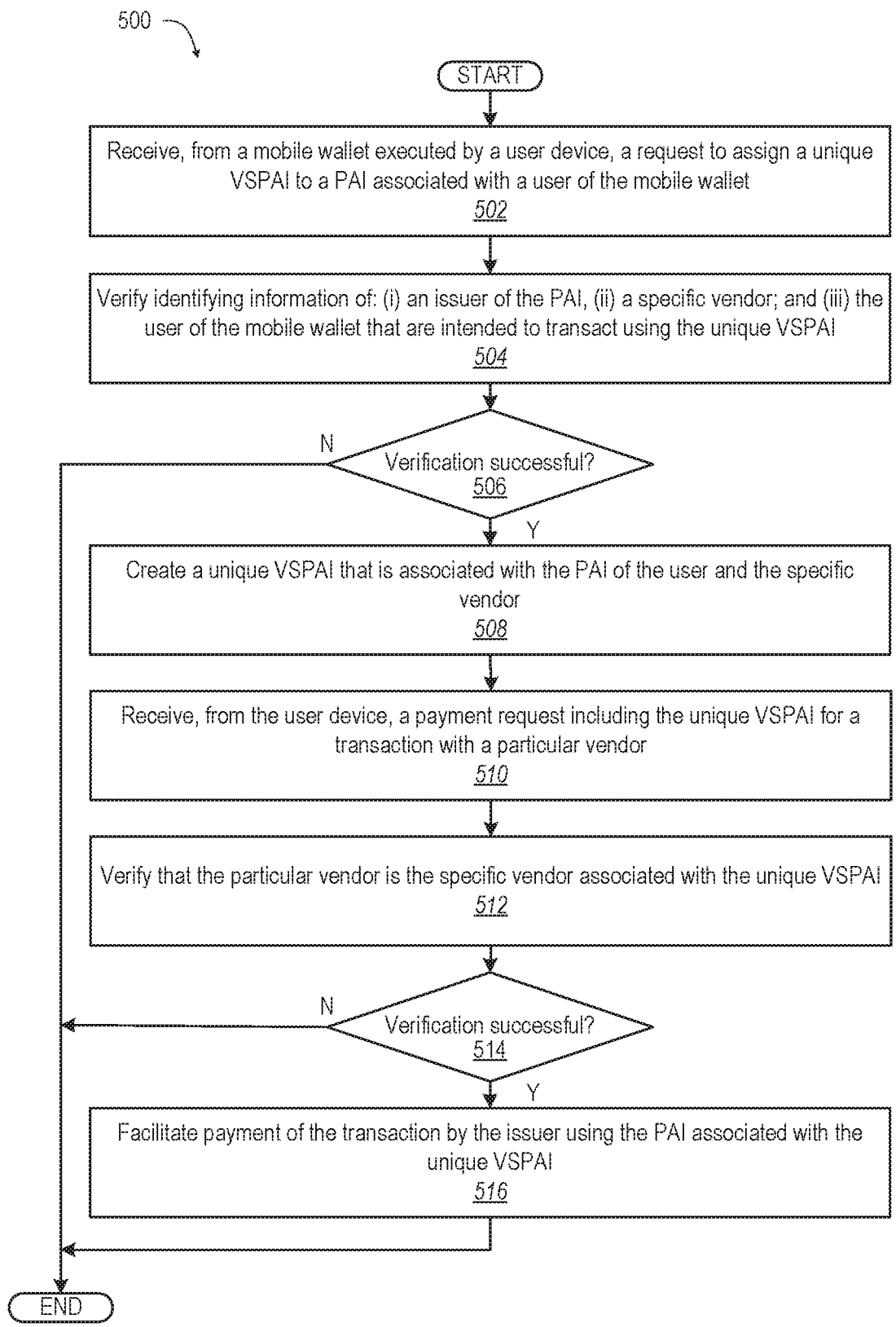
FIG. 5 illustrates a flow diagram of an example method of secure transactions, according to one or more embodiments.

FIG. 5 illustrates a method 500 of providing a secure transaction. In one or more embodiments, the method 500 begins receiving, from a mobile wallet executed by a user device, a request to assign a VSPAI to a PAI associated with a user of the mobile wallet (block 502). Method 500 includes verifying identifying information of: (i) an issuer of the PAI, (ii) a specific vendor; and (iii) the user of the mobile wallet that are intended to transact using the unique VSPAI (block 504). A determination is made whether the verification is successful (decision block 506). In response to determining a successful verification, method 500 includes creating a unique VSPAI that is associated with the PAI of the user and the specific vendor (block 508). In response to determining that the verification is not successful, method 500 ends.

Method 500 includes receiving, from the user device, a payment request including the unique VSPAI for a transaction with a particular vendor (block 510). Method 500 includes verifying that the particular vendor is the specific vendor associated with the unique VSPAI (block 512). A determination is made whether the verification is successful (decision block 514). In response to determining a successful verification, method 500 includes facilitating payment of the transaction by the issuer using the PAI associated with the unique VSPAI (block 516). Then method 500 ends. In response to determining that the verification is not successful in decision block 514, method 500 ends.

In one or more embodiments, the method 500 further includes provisioning the user device with a vendor-specific application that is interfaced to the mobile wallet and that triggers the mobile wallet to request the unique VSPAI. In a particular embodiment, the method 500 further includes receiving a vendor identifier from the mobile application for associating with the unique VSPAI during creation of the unique VSPAI. In a particular embodiment, the method 500 further includes receiving a vendor identifier from the mobile application for associating with the unique VSPAI during verification of the particular vendor for the transaction. In a particular embodiment, the method 500 further includes: (i) receiving the unique VSPAI from the application; and (ii) verifying the particular vendor of the transaction with the mobile wallet.

In one or more embodiments, the mobile wallet provides an application program interface (API) for mobile applications (apps) to communicate with it. When a customer registers with a vendor providing a mobile app at its web site, the mobile app requests the mobile wallet of the customer to get a vendor specific payment account identifier (VSPAI) for a selected payment element (e.g., credit/debit card) via the API. The mobile wallet requests the issuer of the payment element to issue a VSPAI for the specific vendor and sends the VSPAI to the mobile app. The vendor stores the VSPAI and customer profile. The VSPAI is a unique identifier (e.g., number) that can be used as a payment identifier associated with the specific vendor and cannot be used with other vendors. When the customer uses the VSPAI as a payment account at the vendor, the vendor uses the VSPAI to get a payment authorization to the issuer. The issuer authorizes the payment if the VSPAI is used by the specific vendor. The issuer may invalidate the VSPAI if the vendor's web site is hacked or VSPAI is exposed to unauthorized users.

Figure 6:
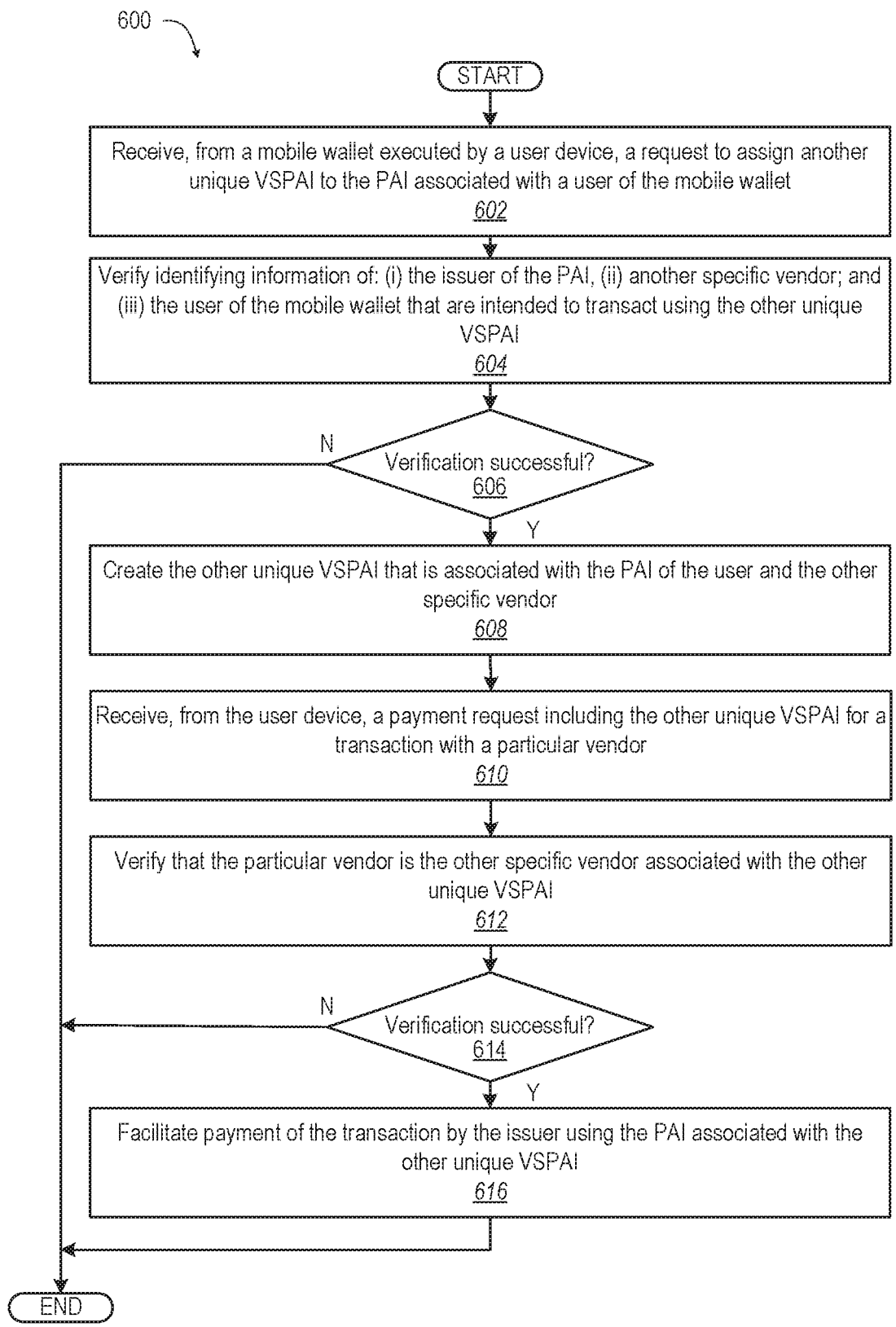
FIG. 6 illustrates a flow diagram of a method of secure transactions by multiple vender-specific payment account identifiers (VSPAIs), according to one or more embodiments.

FIG. 6 illustrates a method 600 of securing transactions using multiple VSPAIs associated with a PAI. In one or more embodiments, method 600 includes receiving, by an information handling system and from the mobile wallet executed by the user device, a request to assign another unique VSPAI to the PAI associated with the user of the mobile wallet (block 602). Method 600 includes verifying identifying information of: (i) the issuer of the PAI, (ii) another specific vendor; and (iii) the user of the mobile wallet that are intended to transact using the other unique VSPAI (block 604). A determination is made whether the verification is successful (decision block 606). In response to determining a successful verification, method 500 includes creating the other unique VSPAI that is associated with the PAI of the user and the other specific vendor (block 608). Method 600 includes receiving, from the user device, a payment request including the other unique VSPAI for a transaction with a particular vendor (block 610). Method 600 includes verifying that the particular vendor is the other specific vendor associated with the other unique VSPAI (block 612). A determination is made whether the verification is successful (decision block 614). In response to determining that the verification was successful, method 600 includes facilitating payment of the transaction by the issuer using the PAI associated with the other unique VSPAI (block 616). Then method 600 ends. In response to determining that the verification is not successful in decision block 614, method 600 ends.

In one or more embodiments, method 600 includes determining that one or more VSPAIs associated with the specific vendor, including the unique VSPAI associated with the user, have has been acquired by an unauthorized third party. The method 700 further includes, in response to determining that the one or more VSPAIs have been acquired by the unauthorized third party: (i) denying any requests for payment using the one or more VSPAIs; and (ii) continuing to process a request for payment for a transaction that includes the other unique VSPAI for the user.

Figure 7:
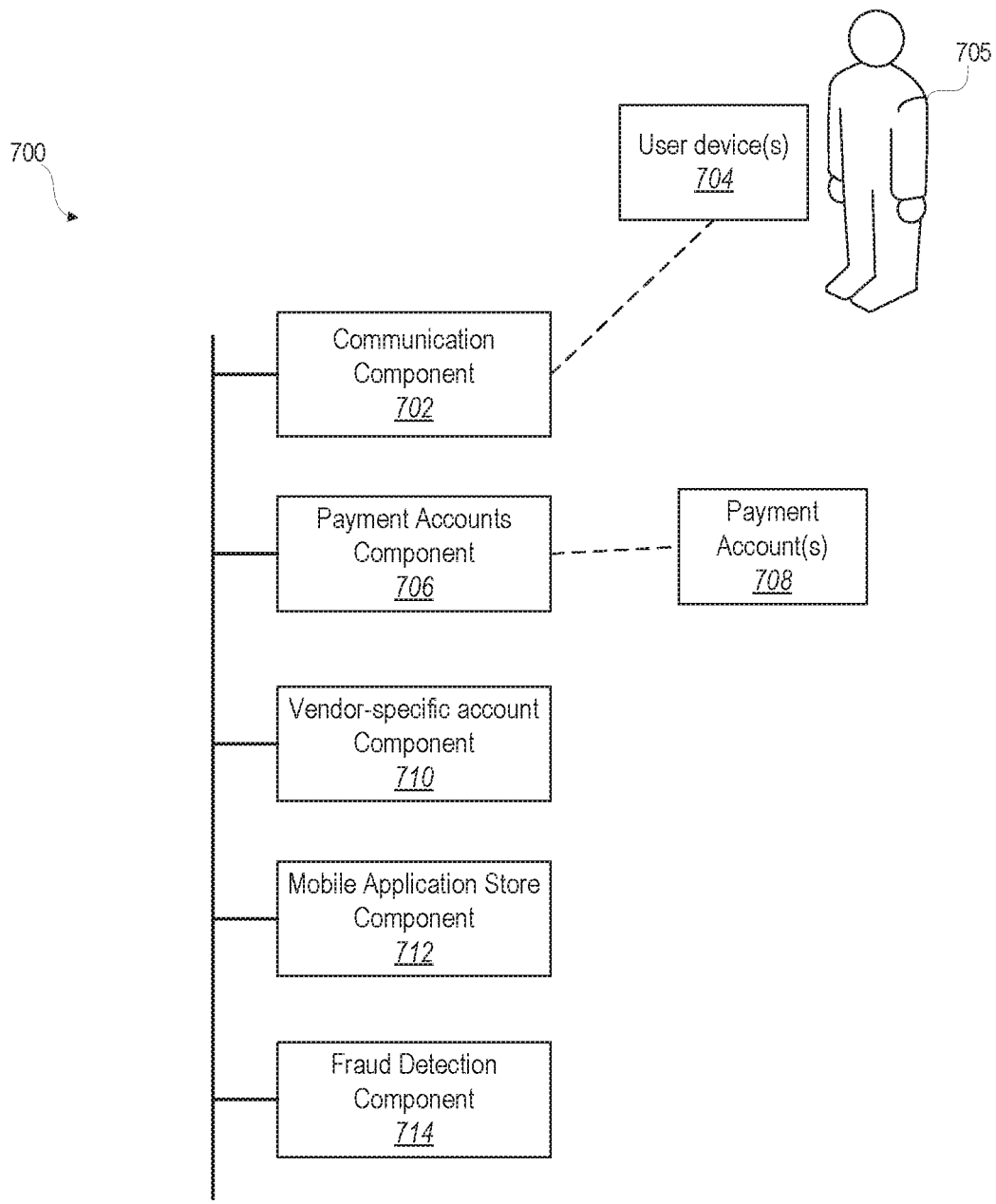
FIG. 7 illustrates a block diagram of a system for secure transactions, according to one or more embodiments.

FIG. 7 illustrates a system 700 that includes a communication component 702 that receives, from a mobile wallet executed by a user device 704, a request to assign a vendor specific payment account identifier (VSPAI) to a payment account identifier (PAI) associated with a user 705 of the mobile wallet. The system 700 includes a payment account component 700 that is coupled to payment account records 708 for verifying identifying information of: (i) an issuer of the PAI, (ii) a specific vendor; and (iii) the user 705 of the mobile wallet that are intended to transact using the unique VSPAI. A vendor-specific account component 710, in response to verifying the identifying information, creates a unique VSPAI that is associated with the PAI of the user and the specific vendor. The communication component 702, from the user device, receives a payment request including the unique VSPAI for a transaction with a particular vendor. The payment account component 706 verifies that the particular vendor is the specific vendor associated with the unique VSPAI. The payment account component 706, in response to verifying that the particular vendor, facilitates payment of the transaction by the issuer using the PAI associated with the unique VSPAI. The system 700 includes a mobile application store component 712 that provisions the user device with a vendor-specific application that is interfaced to the mobile wallet and that triggers the mobile wallet to request the unique VSPAI.

In one or more embodiments, the communication component 702 receives a vendor identifier from the mobile application for associating with the unique VSPAI during creation of the unique VSPAI. In one or more embodiments, the communication component 702 receives a vendor identifier from the mobile application for associating with the unique VSPAI during verification of the particular vendor for the transaction. In one or more embodiments, the communication component 702 receives the payment request comprises receiving the unique VSPAI from the application; and the payment accounts component 706 verifies the particular vendor by verifying the transaction with the mobile wallet via the communication component.

In one or more embodiments, the communication component 702 receives, from the mobile wallet executed by the user device, a request to assign another unique VSPAI to the PAI associated with the user of the mobile wallet. The payment accounts component 706 verifies identifying information of: (i) the issuer of the PAI, (ii) another specific vendor; and (iii) the user of the mobile wallet that are intended to transact using the other unique VSPAI. The vendor-specific account component 710, in response to verifying the identifying information, creates the other unique VSPAI that is associated with the PAI of the user and the other specific vendor. The communication component 702 receives, from the user device, a payment request including the other unique VSPAI for a transaction with a particular vendor. The payment accounts component 706: (i) verifies that the particular vendor is the other specific vendor associated with the other unique VSPAI; and (ii) in response to verifying that the particular vendor is the other specific vendor, facilitates payment of the transaction by the issuer using the PAI associated with the other unique VSPAI.

In one or more embodiments, the system 700 includes a fraud detection component 714 that determines that one or more VSPAIs associated with the specific vendor, including the unique VSPAI associated with the user, have has been acquired by an unauthorized third party. The payment accounts component 706, in response to determining that the one or more VSPAIs have been acquired by the unauthorized third party: (i) denies any requests for payment using the one or more VSPAIs; and (ii) continues to process a request for payment for a transaction that includes the other unique VSPAI for the user 705.

Figure 8:
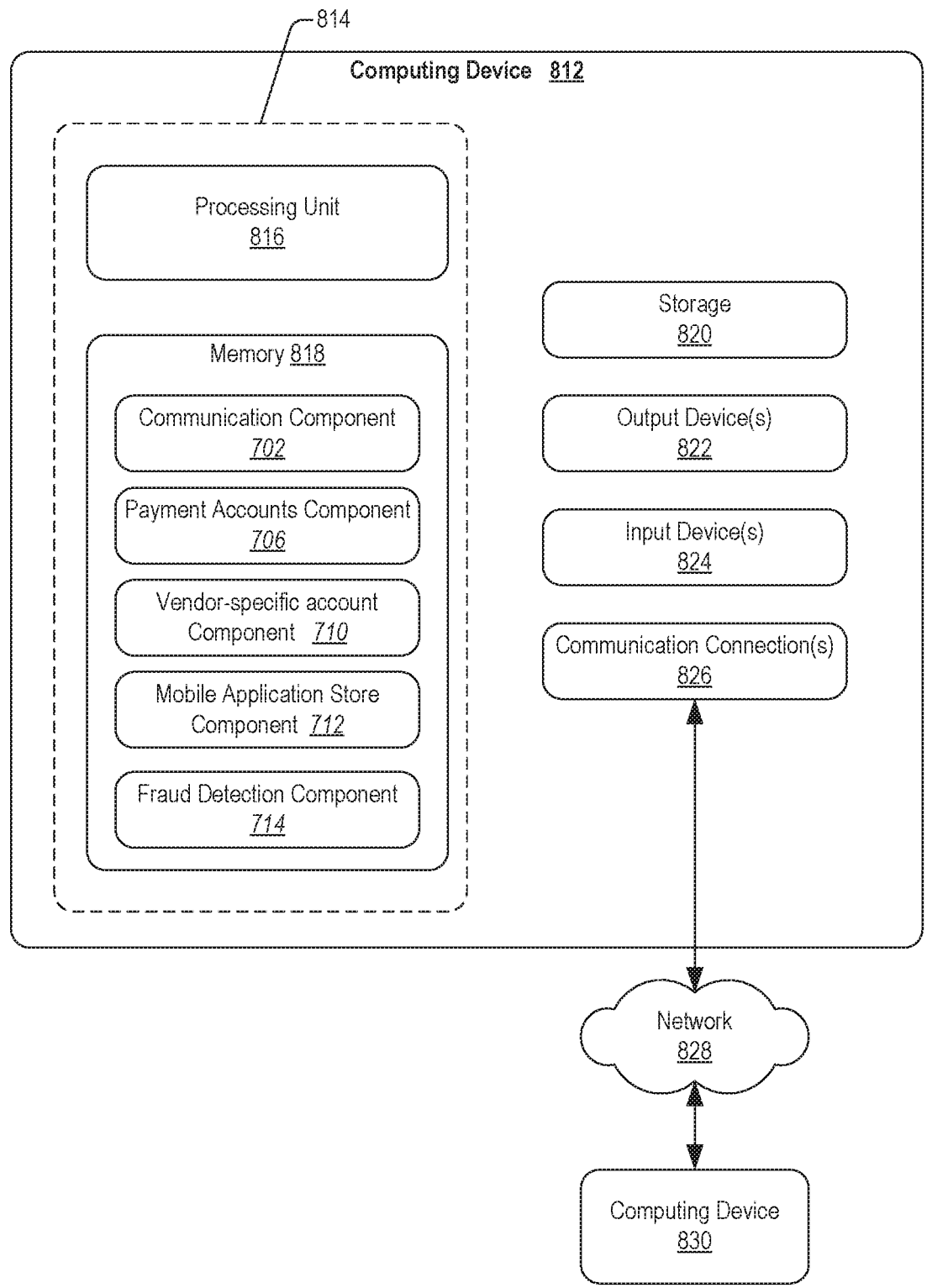
FIG. 8 illustrates a block diagram of a system having a computing device for performing secure transactions, according to one or more embodiments.

FIG. 8 illustrates a system 800 including a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, device 812 includes additional features or functionality. For example, device 812 may include additional storage such as removable storage or non-removable storage, including, but not limited to, magnetic storage, optical storage, etc. Such additional storage is illustrated in FIG. 8 by storage 820. In one or more embodiments, computer readable instructions to implement one or more embodiments provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 812. Any such computer storage media is part of device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device may be included with device 812. Input device(s) 824 and output device(s) 822 may be connected to device 812 via a wired connection, wireless connection, or any combination thereof. In one or more embodiments, an input device or an output device from another computing device may be used as input device(s) 824 or output device(s) 822 for computing device 812. Device 812 may include communication connection(s) 826 to facilitate communications via a network 828 with one or more other computing devices 830.

Certain functionalities of virtual financial continuity can be performed by software applications resident in memory 818, such as a communication component 702, payment accounts component 706, vendor-specific accounts component 710, mobile application store component 712, and fraud detection component 714.

Figure 9:
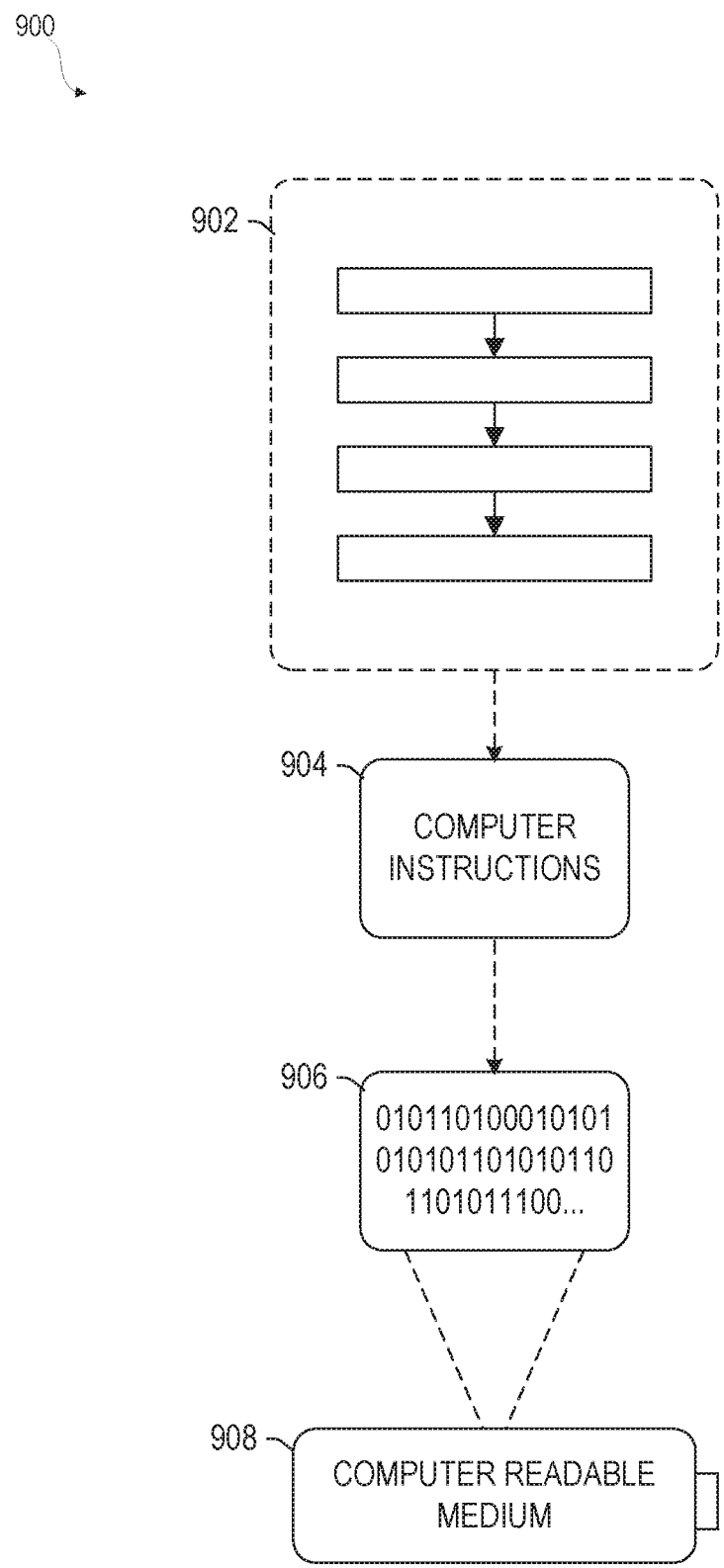
FIG. 9 illustrates a block diagram of example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 9, wherein an implementation 900 includes a computer-readable medium 908, such as a CD-R, DVD-R, flash drive, a platter of a hard disk drive, etc., on which is encoded computer-readable data 906. This computer-readable data 906, such as binary data including a plurality of zero's and one's as shown in 906, in turn includes a set of computer instructions 904 configured to operate according to one or more of the principles set forth herein. In one such embodiment 900, the processor-executable computer instructions 904 may be configured to perform a method 902, such as method 400 of FIG. 4, method 500 of FIG. 5, or method 600 of FIG. 6. In another embodiment, the processor-executable instructions 904 may be configured to implement a system, such as the system 700 of FIG. 7. Many such computer-readable media may be devised by those of ordinary skill in the art that are configured to operate in accordance with the techniques presented herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method of providing a secure transaction, the method comprising:

receiving, from a mobile wallet executed by a user device, a request to assign a unique vendor specific payment account identifier (VSPAI) to a payment account identifier (PAI) associated with a user of the mobile wallet;

verifying identifying information of: (i) an issuer of the PAI, (ii) a specific vendor; and (iii) the user of the mobile wallet that are intended to transact using the unique VSPAI, wherein the specific vendor is an online vendor having a vendor application on the user device, wherein the verifying comprises:

requesting, via a first application programming interface (API) between the mobile wallet and the specific vendor, a vendor identification (vendor ID) from the specific vendor; and sending, via a second API between the mobile wallet and the issuer, a user identification and the vendor identification to the issuer;

matching the user identification and the vendor identification to stored information at the issuer; and in response to verifying the identifying information, creating, by a vendor-specific account component having a processor, a unique VSPAI that is associated with the PAI of the user and the specific vendor and is exclusively used for at least two transactions between the user and the specific vendor;

sending, via the second API over a communication network, the unique VSPAI to a mobile wallet application on the user device;
provisioning the user device with a vendor-specific application that is interfaced to the mobile wallet and that triggers the mobile wallet to request the unique VSPAI;
receiving, from the user device over the communication network, a payment request including the unique VSPAI for each transaction of the at least two transactions with a particular vendor;
verifying whether the particular vendor is the specific vendor associated with the unique VSPAI for each payment request;
in response to verifying that the particular vendor is the specific vendor, facilitating payment of the at least two transactions by the issuer using the PAI associated with the unique VSPAI; and
in response to verifying that the particular vendor is not the specific vendor, denying the payment request.

2. The method of claim 1, further comprising receiving a vendor identifier from the vendor application that is associated with the unique VSPAI during creation of the unique VSPAI.

3. The method of claim 1, further comprising receiving a vendor identifier from the vendor application that is associated with the unique VSPAI during verification of the particular vendor for the each transaction of the at least two transactions.

4. The method of claim 1, wherein:
receiving the payment request comprises receiving the unique VSPAI from the vendor application; and
verifying the particular vendor comprises verifying each transaction of the at least two transactions with the mobile wallet.

5. The method of claim 1, further comprising:
receiving, from the mobile wallet executed by the user device, a second request to assign a second unique VSPAI to the PAI associated with the user of the mobile wallet;
verifying identifying information of: (i) the issuer of the PAI, (ii) a second specific vendor; and (iii) the user of the mobile wallet that are intended to transact using the second unique VSPAI; and
in response to verifying the identifying information, creating the second unique VSPAI that is associated with the PAI of the user and the other specific vendor;
receiving, from the user device, a payment request including the second unique VSPAI for a transaction with a particular vendor;
verifying that the particular vendor is the second specific vendor associated with the second unique VSPAI; and
in response to verifying that the particular vendor is the second specific vendor, facilitating payment of the transaction by the issuer using the PAI associated with the second unique VSPAI.

6. The method of claim 5, further comprising:
determining that one or more VSPAIs are associated with the specific vendor are acquired by an unauthorized third party, wherein the one or more VSPAIs include the unique VSPAI associated with the user;
in response to determining that the one or more VSPAIs have been acquired by the unauthorized third party:
denying any requests for payment using the one or more VSPAIs; and
continuing to process a request for payment for a transaction that includes the second unique VSPAI for the user.

7. A system comprising:
one or more processors;
a memory storing one or more instructions that, when executed by the one or more processors, cause the one or more processors to perform a method comprising:
receiving, from a mobile wallet executed by a user device, a request to assign a unique vendor specific payment account identifier (VSPAI) to a payment account identifier (PAI) associated with a user of the mobile wallet;
verifying identifying information of: (i) an issuer of the PAI, (ii) a specific vendor; and (iii) the user of the mobile wallet that are intended to transact using the unique VSPAI, wherein the specific vendor is an online vendor having a vendor application on the user device, wherein the verifying comprises:
requesting, via a first application programming interface (API) between the mobile wallet and the specific vendor, a vendor identification (vendor ID) from the specific vendor; and
sending, via a second API between the mobile wallet and the issuer, a user identification and the vendor identification to the issuer;
matching the user identification and the vendor identification to stored information at the issuer;
in response to verifying the identifying information, creating the unique VSPAI that is associated with the PAI of the user and the specific vendor and is exclusively used for at least two transactions between the user and the specific vendor;
provisioning the user device with the vendor application that is interfaced to the mobile wallet and that triggers the mobile wallet to request the unique VSPAI;
receiving, from the user device over a communication network, a payment request including the unique VSPAI for each transaction of the at least two transactions with a particular vendor;
verifying whether the particular vendor is the specific vendor associated with the unique VSPAI for each payment request; and
in response to verifying that the particular vendor is the specific vendor, facilitating payment of the at least two transactions by the issuer using the PAI associated with the unique VSPAI or, in response to verifying that the particular vendor is not the specific vendor, deny the payment request.

8. The system of claim 7, the method further comprising:
receiving a vendor identifier from the vendor application that is associated with the unique VSPAI during creation of the unique VSPAI.

9. The system of claim 7, the method further comprising:
receiving a vendor identifier from the vendor application that is associated with the unique VSPAI during verification of the particular vendor for each transaction of the at least two transactions.

10. The system of claim 7, the method further comprising:
receiving the payment request comprises receiving the unique VSPAI from the application; and
verifying the particular vendor by verifying each transaction of the at least two transactions with the mobile wallet.

11. The system of claim 7, the method further comprising:
receiving, from the mobile wallet executed by the user device, a request to assign a second unique VSPAI to the PAI associated with the user of the mobile wallet;
verifying identifying information of: (i) the issuer of the PAI, (ii) a second specific vendor; and (iii) the user of the mobile wallet that are intended to transact using the second unique VSPAI; and in response to verifying the identifying information, creating the second unique VSPAI that is associated with the PAI of the user and the second specific vendor;

receiving, from the user device, a payment request including the second unique VSPAI for a transaction with a particular vendor;

verifying that the particular vendor is the second specific vendor associated with the second unique VSPAI; and in response to verifying that the particular vendor is the second specific vendor, facilitating payment of the each transaction of the at least two transactions by the issuer using the PAI associated with the second unique VSPAI.

12. The system of claim 11, the method further comprising:

determining that one or more VSPAIs are associated with the specific vendor have been acquired by an unauthorized third party, wherein the one or more VSPAIs include the unique VSPAI associated with the user, wherein:

in response to determining that the one or more VSPAIs have been acquired by the unauthorized third party:

denying any requests for payment using the one or more VSPAIs; and continuing to process a request for payment for any transaction that includes the second unique VSPAI for the user.

13. A non-transitory computer-readable storage medium comprising computer-executable instructions, which when executed via a processing unit on a computer performs acts, comprising:

receiving, from a mobile wallet executed by a user device, a request to assign a unique vendor specific payment account identifier (VSPAI) to a payment account identifier (PAI) associated with a user of the mobile wallet;

verifying identifying information of: (i) an issuer of the PAI, (ii) a specific vendor; and (iii) the user of the mobile wallet that are intended to transact using the unique VSPAI, wherein the specific vendor is an online vendor having a vendor application on the user device, wherein the verifying comprises:

requesting, via a first application programming interface (API) between the mobile wallet and the specific vendor, a vendor identification (vendor ID) from the specific vendor; and sending, via a second API between the mobile wallet and the issuer, a user identification and the vendor identification to the issuer;

matching the user identification and the vendor identification to stored information at the issuer;

in response to verifying the identifying information, creating the unique VSPAI that is associated with the PAI of the user and the specific vendor and is exclusively used for at least two transactions between the user and the specific vendor;

provisioning the user device with the vendor application that is interfaced to the mobile wallet and triggers the mobile wallet to request the unique VSPAI;

receiving, from the user device over a communication network, a payment request including the unique VSPAI for each transaction of the at least two transactions with a particular vendor;

verifying whether the particular vendor is the specific vendor associated with the unique VSPAI for each payment request;

in response to verifying that the particular vendor is the specific vendor, facilitating payment of the at least two transactions by the issuer using the PAI associated with the unique VSPAI; and in response to verifying that the particular vendor is not the specific vendor, denying the payment request.

14. The non-transitory computer-readable storage medium comprising computer-executable instructions of claim 13, further comprising receiving a vendor identifier from the vendor application that is associated with the unique VSPAI during creation of the unique VSPAI.

15. The non-transitory computer-readable storage medium comprising computer-executable instructions of claim 13, further comprising receiving a vendor identifier from the vendor application that is associated with the unique VSPAI during verification of the particular vendor for the transaction.

16. The non-transitory computer-readable storage medium comprising computer-executable instructions of claim 13, wherein:

receiving the payment request comprises receiving the unique VSPAI from the vendor application; and verifying the particular vendor comprises verifying the transaction with the mobile wallet.

17. The non-transitory computer-readable storage medium comprising computer-executable instructions of claim 13, further comprising:

receiving, from the mobile wallet executed by the user device, a request to assign a second unique VSPAI to the PAI associated with the user of the mobile wallet;

verifying identifying information of: (i) the issuer of the PAI, (ii) a second specific vendor; and (iii) the user of the mobile wallet that are intended to transact using the other unique VSPAI; and in response to verifying the identifying information, creating the second unique VSPAI that is associated with the PAI of the user and the second specific vendor;

receiving, from the user device, a payment request including the second unique VSPAI for a transaction with a particular vendor;

verifying that the particular vendor is the second specific vendor associated with the second unique VSPAI;

in response to verifying that the particular vendor is the second specific vendor, facilitating payment of the transaction by the issuer using the PAI associated with the second unique VSPAI;

determining that one or more VSPAIs are associated with the specific vendor are acquired by an unauthorized third party, wherein the one or more VSPAIs include the unique VSPAI associated with the user;

in response to determining that the one or more VSPAIs have been acquired by the unauthorized third party:

denying any requests for payment using the one or more VSPAIs; and continuing to process a request for payment for a transaction that includes the second unique VSPAI for the user.

* * * * *